United States Patent
Zhou et al.

(10) Patent No.: US 10,001,962 B2
(45) Date of Patent: Jun. 19, 2018

(54) CONTROL METHOD, CONTROL APPARATUS, AND ELECTRONIC DEVICE

(71) Applicant: Lenovo (Beijing) Co., Ltd., Beijing (CN)

(72) Inventors: Xiaoyu Zhou, Beijing (CN); Jun Xie, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 79 days.

(21) Appl. No.: 14/835,795

(22) Filed: Aug. 26, 2015

(65) Prior Publication Data
US 2016/0313960 A1    Oct. 27, 2016

(30) Foreign Application Priority Data
Apr. 24, 2015   (CN) .......................... 2015 1 0201378

(51) Int. Cl.
*G06F 3/14*   (2006.01)

(52) U.S. Cl.
CPC ....... *G06F 3/1454* (2013.01); *G09G 2354/00* (2013.01)

(58) Field of Classification Search
CPC .......................... G06F 3/1454; G09G 2354/00
See application file for complete search history.

(56) References Cited

U.S. PATENT DOCUMENTS

| | | | | |
|---|---|---|---|---|
| 2011/0314093 A1* | 12/2011 | Sheu | ...................... | G06F 9/4445 709/203 |
| 2013/0120251 A1* | 5/2013 | Lee | ........................ | G06F 3/1438 345/157 |
| 2014/0055401 A1* | 2/2014 | Ye | ........................... | G06F 3/041 345/173 |
| 2015/0026586 A1* | 1/2015 | Nylund | ................. | H04L 67/025 715/740 |

* cited by examiner

*Primary Examiner* — Latanya Bibbins
(74) *Attorney, Agent, or Firm* — Harness, Dickey & Pierce, P.L.C.

(57) ABSTRACT

A control method and a control apparatus are provided. The method includes: monitoring whether a first trigger event is generated when a first electronic device outputs, based on display data, a first display content via a first display unit coupling the first electronic device, wherein the display data is transmitted to the first electronic device by a second electronic device and corresponds to a second display content of the second electronic device, wherein the second display content is same as the first display content; mapping the first trigger event to first information that can be recognized by the second electronic device, if it is detected that the first trigger event is generated; and transmitting the first information to the second electronic device, to instruct the second electronic device to perform a first operation. An electronic device is further provided.

8 Claims, 5 Drawing Sheets

CONTROL METHOD, CONTROL APPARATUS, AND ELECTRONIC DEVICE

CROSS-REFERENCE TO RELATED APPLICATIONS

This application claims priority to Chinese Patent Application No. 201510201378.2, titled "CONTROL METHOD, CONTROL APPARATUS, AND ELECTRONIC DEVICE", filed with the Chinese State Intellectual Property Office on Apr. 24, 2015, which is incorporated by reference in its entirety herein.

FIELD

The present disclosure relates to the field of control technology, and in particular to a control method, a control apparatus, and an electronic device.

BACKGROUND

With the rapid development of electronic technology, a content being displayed on an electronic device (referred to as a source electronic device hereinafter) can be projected to be displayed on another electronic device (referred to as a target electronic device hereinafter). For instance, a content being displayed in a cell phone can be projected to be displayed on a device with a large screen such as a television (TV), i.e., both the cell phone and the device with a large screen display the same content.

However, when the content being displayed on the source electronic device is projected to be displayed on the target electronic device, if a user inputs from the target electronic device an operation not supported by the source electronic device, the source electronic device cannot recognize or process the operation. For instance, when the content displayed on a cell phone is projected to a computer for display, the user may habitually input instructions commonly used on a computer, such as ctrl+alt+del, from the computer, while the cell phone cannot recognize or process these instructions. Thus the operation is inconvenience for the user.

SUMMARY

A control method, a control apparatus and an electronic device are provided according to embodiments of the present disclosure, to enable a source electronic device to recognize and process an input operation performed from a target electronic device but not supported by the source electronic device, to improve operation convenience for a user.

Technical solutions as follows are provided according to embodiments of the present disclosure.

A control method includes:

monitoring whether a first trigger event is generated when a first electronic device outputs, based on display data, a first display content via a first display unit coupled to the first electronic device, where the display data is transmitted to the first electronic device by a second electronic device and corresponds to a second display content of the second electronic device, where the second display content is same as the first display content;

mapping the first trigger event to first information that can be recognized by the second electronic device, if it is detected that the first trigger event is generated; and transmitting the first information to the second electronic device, where the first information is used to instruct the second electronic device to perform a first operation.

Optionally, in the above method, the mapping the first trigger event to first information that can be recognized by the second electronic device includes:

mapping the first trigger event to data information that can be recognized by the second electronic device, or to a first control instruction corresponding to a second trigger event that can be recognized by the second electronic device.

Optionally, in the above method, the mapping the first trigger event to first information that can be recognized by the second electronic device includes:

determining whether the first trigger event is a trigger event that can be recognized by the second electronic device;

mapping the first trigger event to the first information that can be recognized by the second electronic device if the first trigger event is not a trigger event that can be recognized by the second electronic device; and determining the first trigger event to be the first information if the first trigger event is a trigger event that can be recognized by the second electronic device.

Optionally, in the above method, the mapping the first trigger event to first information that can be recognized by the second electronic device includes:

transmitting the first trigger event to the second electronic device; and mapping the first trigger event to the first information that can be recognized by the second electronic device, upon receiving a parsing request transmitted by the second electronic device.

A control method includes:

monitoring whether first information transmitted by a first electronic device is received by a second electronic device when the second electronic device transmits display data to the first electronic device, where the display data corresponds to a second display content output by the second electronic device via a second display unit coupled to the second electronic device, and the first information is mapped from a first trigger event by the first electronic device and can be recognized by the second electronic device if it is detected that the first trigger event is generated when the first electronic device outputs based on the display data a first display content via the first display unit, where the first display content is same as the second display content; and performing a first operation according to the first information upon receiving the first information transmitted by the first electronic device.

Optionally, in the above method, where the monitoring whether first information transmitted by a first electronic device is received includes:

monitoring whether either data information that is transmitted by the first electronic device and can be recognized by the second electronic device or a first control instruction corresponding to a second trigger event that can be recognized by the second electronic device is received.

Optionally, in the above method further includes:

monitoring whether a predetermined condition is met; and switching an operation mode of the second display unit from a first operation mode to a second operation mode upon detecting the predetermined condition is met, where the power consumption of the second display unit in the first operation mode is higher than that in the second operation mode.

Optionally, in the above method, the monitoring whether a predetermined condition is met includes:

monitoring whether the second electronic device transmits the display data to the first electronic device; and determining the predetermined condition is met if it is detected that the second electronic device transmits the display data to the first electronic device.

Optionally, in the above method, the monitoring whether first information transmitted by a first electronic device is received includes:

determining whether the first trigger event can be recognized by the second electronic device upon receiving the first trigger event transmitted by the first electronic device;

determining the first information transmitted by the first electronic device is received if it is determined that the first trigger event can be recognized by the second electronic device, where the first information is the first trigger event; and transmitting a parsing request to the first electronic device if the first trigger event cannot be recognized by the second electronic device, and receiving the first information transmitted by the first electronic device, where the first information is mapped from the first trigger event by the first electronic device.

A control apparatus includes:

a first monitoring module, configured to monitor whether a first trigger event is generated when a first electronic device outputs, based on display data, a first display content via a first display unit coupled to the first electronic device, where the display data is transmitted to the first electronic device by a second electronic device and corresponds to a second display content of the second electronic device, where the second display content is same as the first display content;

a mapping module, configured to map the first trigger event to first information that can be recognized by the second electronic device, if it is detected that the first trigger event is generated; and a transmitting module, configured to transmit the first information to the second electronic device, where the first information is used to instruct the second electronic device to perform a first operation.

Optionally, in the above apparatus, the mapping module includes:

a determining unit, configured to determine whether the first trigger event is a trigger event that can be recognized by the second electronic device;

a first mapping unit, configured to map the first trigger event to the first information that can be recognized by the second electronic device, if the determining unit determines the first trigger event is not a trigger event that can be recognized by the second electronic device; and a second mapping unit, configured to determine the first trigger event to be the first information, if the determining unit determines the first trigger event is a trigger event that can be recognized by the second electronic device.

Optionally, in the above apparatus, the mapping module includes:

a transmitting unit, configured to transmit the first trigger event to the second electronic device; and a third mapping unit, configured to map the first trigger event to the first information that can be recognize by the second electronic device, upon receiving a parsing request transmitted by the second electronic device.

A control apparatus includes:

a second monitoring module, configured to monitor whether first information transmitted by a first electronic device is received by a second electronic device when the second electronic device transmits display data to the first electronic device, where the display data corresponds to a second display content output by the second electronic device via a second display unit coupled to the second electronic device, and the first information is mapped from a first trigger event by the first electronic device and can be recognized by the second electronic device if it is detected that the first trigger event is generated when the first electronic device outputs based on the display data a first display content via the first display unit, where the first display content is same as the second display content; and an execution module, configured to perform a first operation a first operation according to the first information in a case that the second monitoring module detects that the first information transmitted by the first electronic device is received.

Optionally, the above apparatus further includes:

a third monitoring module, configured to monitor whether a predetermined condition is met; and a switching module, configured to switch the operation mode of the second display unit from a first operation mode to a second operation mode in a case that the third monitoring module detects that the predetermined condition is met, where the power consumption of the second display unit in the first operation mode is higher than that in the second operation mode.

An electronic device includes any of the apparatus above.

According to the technical solutions above, whether a first trigger event is generated is monitored when a first electronic device outputs, based on display data, a first display content via a first display unit coupled to the first electronic device. The display data is transmitted to the first electronic device by a second electronic device and corresponds to a second display content of the second electronic device. The second display content is same as the first display content. If it is detected that the first trigger event is generated, the first trigger event is mapped to first information that can be recognized by the second electronic device. And the first information is transmitted to the second electronic device, to instruct the second electronic device to perform a first operation. Thus, the second electronic device (corresponding to the source electronic device) can recognize and process an input operation that is input from the first electronic device (corresponding to the target electronic device) and is not supported by the second electronic device, thereby improving operation convenience for a user.

BRIEF DESCRIPTION OF THE DRAWINGS

The drawings to be used in the description of embodiments of the present disclosure and some other technologies are described briefly as follows, so that technical solutions according to the embodiments of the present disclosure or according to some other technologies can become clearer. Apparently the drawings in the following description merely illustrate a few embodiments of the present disclosure. For those skilled in the art, other drawings may be obtained based on these drawings without any creative work.

The terms such as "first," "second," "third," "fourth," and the like in the specification and in the claims, if any, are used for distinguishing similar elements and not necessarily for describing a particular sequential or chronological order. It can be understood that the terms so used are interchangeable under appropriate circumstances such that the embodiments of the present disclosure herein are capable of operation in sequences other than those illustrated or described herein.

DETAILED DESCRIPTION

Technical solutions according to embodiments of the present disclosure are described clearly and completely hereinafter in conjunction with the drawings. It is obvious that the described embodiments are merely a few rather than all of the embodiments according to the present disclosure. Any other embodiments obtained by those skilled in the art based on the embodiments in the present disclosure without any creative work fall in the scope of the present disclosure.

Figure 1:
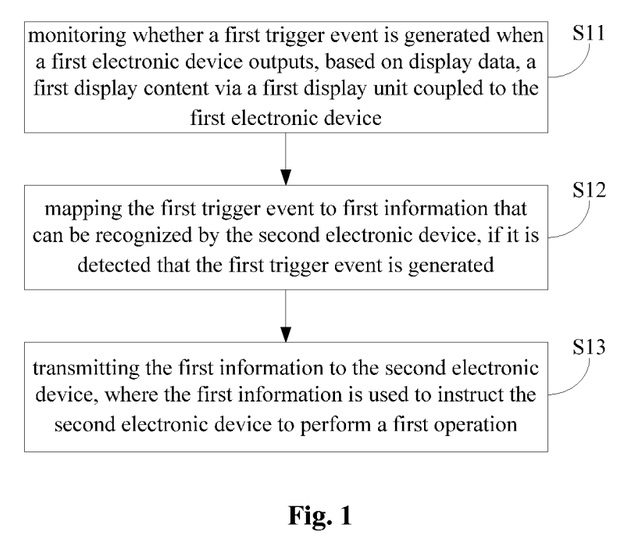
FIG. 1 is a flowchart of an implementation of a control method according to an embodiment of the present disclosure.

Reference is made to FIG. 1, which is a flowchart of a control method provided according to an embodiment of the present disclosure. A first electronic device may be an electronic device with a large display screen such as a TV, a desktop computer or a projector, or an electronic device with a small display screen such as a laptop computer or a cell phone. The control method according to the embodiment of the present disclosure may include the steps as follows.

Step S11 includes monitoring whether a first trigger event is generated when a first electronic device outputs, based on display data, a first display content via a first display unit coupled to the first electronic device;

where the display data is transmitted to the first electronic device by a second electronic device and corresponds to a second display content of the second electronic device, where the second display content is same as the first display content.

In other words, in the embodiment of the present disclosure, the first electronic device can synchronously display a content displayed on the second electronic device.

The second display content may be a content being displayed in the second electronic device, or a content to be displayed in the second electronic device.

The first trigger event may be:

a click trigger event, such as an event triggered by an operator such as a stylus or a finger clicking at an area of the first display unit, or by a user clicking at the area via a mouse;

a key-press trigger event, such as an event triggered by an operator pressing a key of the first electronic device;

a wheel trigger event, such as an event triggered by a user rolling a wheel of a mouse; or a slide trigger event, such as an event triggered by an operator sliding along a predetermined track on a touch screen.

In practice, the trigger event in the embodiment of the present disclosure is not limited to the trigger events above, and may be another trigger event such as a non-contact operation trigger event.

Optionally, the first trigger event is a trigger event not supported by the second electronic device.

Step S12 includes mapping the first trigger event to first information that can be recognized by the second electronic device, if it is detected that the first trigger event is generated.

The first trigger event can be mapped, according to a predetermined mapping rule, to the first information that can be recognized by the second electronic device.

And, various trigger events can be mapped to various information that can be recognized by the second electronic device.

Step S13 includes transmitting the first information to the second electronic device, where the first information is used to instruct the second electronic device to perform a first operation.

The first information is transmitted to the second electronic device to instruct the second electronic device to perform a first operation corresponding to the first information.

According to the control method provided in the embodiment of the present disclosure, whether a first trigger event is generated is monitored when the first electronic device outputs, based on display data, a first display content via the first display unit. The display data is transmitted to the first electronic device by a second electronic device and corresponds to a second display content of the second electronic device. The second display content is same as the first display content. If it is detected that the first trigger event is generated, the first trigger event is mapped to first information that can be recognized by the second electronic device. And the first information is transmitted to the second electronic device, to instruct the second electronic device to perform a first operation. Thus, the second electronic device (corresponding to the source electronic device) can recognize and process an input operation that is input from the first electronic device (corresponding to the target electronic device) and is not supported by the second electronic device, thereby improving operation convenience for a user.

In accordance with one control method, when the second electronic device such as a cell phone transmits display data corresponding to a second display content of the second electronic device to a first electronic device such as a computer and the first electronic device outputs a first display content via a first display unit, the second electronic device does not support and thus cannot recognize or respond to some operations on the first electronic device. According to this embodiment of the present disclosure, an instruction input into the first electronic device, where the instruction is not supported by the second electronic device, can be mapped to instructions that can be recognized the second electronic device, so that the second electronic device can recognize and respond to the instruction which is input from the first electronic device and is originally not supported by the second electronic device.

If the first electronic device is a device with a large screen such as a TV, a laptop computer or a desktop computer and the second electronic device is a hand-held terminal with a small screen such as a cell phone, when the second electronic device is controlled from the first electronic device which is larger than the second electronic device, it is more convenient for a user to operate the second electronic device from the first electronic device, and input operations habitually used by the user can be still be used.

Optionally, the mapping the first trigger event to first information that can be recognized by the second electronic device may include:

mapping the first trigger event to data information, such as characters like Chinese characters, symbols, numbers, or Chinese Pinyin, that can be recognized by the second electronic device. In other words, if a user wants to input data information into the second electronic device, the data information to be input can be determined by an input method editor in the first electronic device and transmitted to the second electronic device, then the second electronic device displays the data information at a predetermined location of the display area.

The coordinate mapping relationship between a display area of the first electronic device and of the display area of the second electronic device may be established, so that the coordinates for displaying the data information on the second electronic device can be determined according to determined coordinates of a spot where the inputting is performed on the first electronic device.

Or, the first trigger event may be mapped to a first control instruction corresponding to a second trigger event that can be recognized by the second electronic device, i.e., the first trigger event is mapped to a control instruction that can be recognized by the second electronic device.

For instance, in a case that the first electronic device is a computer and the second electronic device is a cell phone, the event triggered by a combination of three keys "ctrl," "alt," and "del" in the computer may be mapped to a screen lock control instruction in the cell phone. The "PageUP" or the "PageDown" key pressing in the computer may be mapped to a slide operation to the left or to the right on the touch screen of the cell phone. An operation of rolling the wheel of the mouse upward or downward in the computer may be mapped to a slide operation upward or downward on the touch screen of the cell phone.

A particular control instruction to which a trigger event is mapped may be set according to an operating habit of the user.

In this embodiment of the present disclosure, a user not only can control the second electronic device from the first electronic device, but also can input information into the second electronic device by the aid of an input method editor and an input device of the first electronic device.

Usually, an input method editor of the first electronic device and an input method editor of the second electronic device are different. In order to avoid confliction between the input method editor of the first electronic device and the input method editor of the second electronic device when information is input into the second electronic device via the first electronic device, the input method editor of the second electronic device can be blocked, i.e., the second electronic device does not respond to the input method editor of the second electronic device when the second electronic device transmits display data (where the display data is transmitted by the second electronic device to the first electronic device and corresponds to a second display content of the second electronic device) to the first electronic device.

Figure 2:
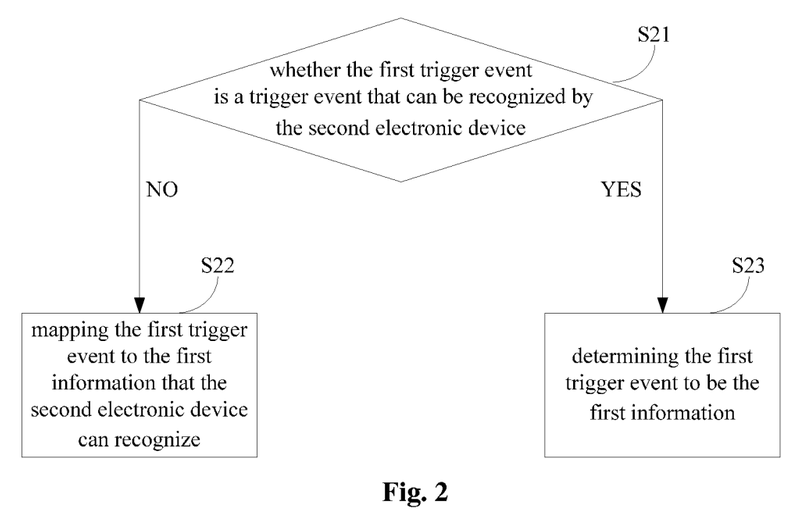
FIG. 2 is a flowchart of an implementation of mapping a first trigger event to first information that can be recognized by the second electronic device according to an embodiment of the present disclosure.

Optionally, a flowchart of an implementation of mapping a first trigger event to first information that can be recognized by the second electronic device is illustrated in FIG. 2, which may include:

step S21 including determining whether the first trigger event is a trigger event that can be recognized by the second electronic device, executing step S22 if no, otherwise executing step S23;

step S22 including mapping the first trigger event to the first information that the second electronic device can recognize; and step S23 including determining the first trigger event to be the first information.

In this embodiment of the present disclosure, whether the first trigger event is a trigger event mapping the first trigger event to first information that can be recognized by the second electronic device is determined after the generation of the first trigger event is detected. The first trigger event is transmitted as first information to the second electronic device if the second electronic device can recognize the first trigger event, i.e., the first trigger event itself is a trigger event that can be recognized by the second electronic device. The first trigger event is mapped to the first information that can be recognized by the second electronic device only if the first trigger event originally cannot be recognized by the second electronic device.

In the embodiment of the present disclosure, only a trigger event that the second electronic device cannot recognize is mapped, which improves operating efficiency and lowers power consumption of the first electronic device.

Figure 3:
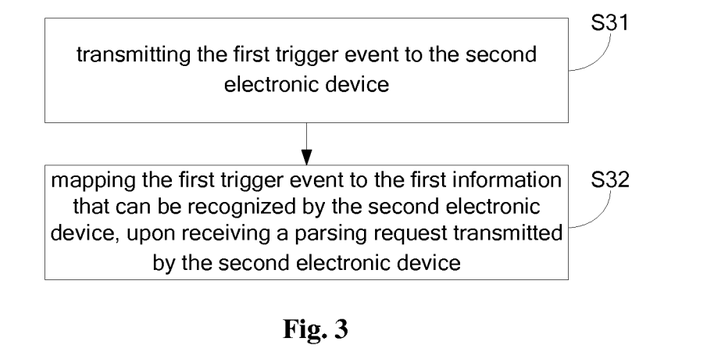
FIG. 3 is a flowchart of another implementation of mapping a first trigger event to first information that can be recognized by the second electronic device according to an embodiment of the present disclosure.

Optionally, a flowchart of another implementation of mapping a first trigger event to first information that can be recognized by the second electronic device is illustrated in FIG. 3, which may include:

step S31 including transmitting the first trigger event to the second electronic device; and step S32 including mapping the first trigger event to the first information that can be recognized by the second electronic device, upon receiving a parsing request transmitted by the second electronic device.

This embodiment of the present disclosure differs from the embodiment illustrated in FIG. 2 in that the first trigger event is directly transmitted to the second electronic device and then whether the second electronic device can recognize the first trigger event is determined by the second electronic device. The parsing request is transmitted to the first electronic device if the second electronic device cannot recognize the first trigger event. The first trigger event is mapped only if the first electronic device receives the parsing request transmitted by the second electronic device, which also improves operating efficiency and lowers power consumption of the first electronic device.

Figure 4:
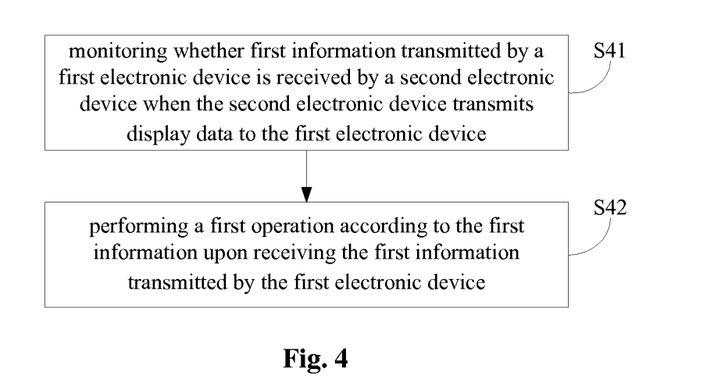
FIG. 4 is a flowchart of another implementation of a control method according to an embodiment of the present disclosure.

A control method is further provided according to an embodiment of the present disclosure. A second electronic device may be an electronic device with a small display screen such as a tablet or a cell phone, or an electronic device with a large display screen such as a TV, a desktop computer or a projector. A flowchart of an implementation of the control method according to an embodiment of the present disclosure is illustrated in FIG. 4, which may include the steps S41 and S42 as follows.

Step S41 includes monitoring whether first information transmitted by a first electronic device is received by a second electronic device when the second electronic device transmits display data to the first electronic device;

where the display data corresponds to a second display content output by the second electronic device via a second display unit coupled to the second electronic device, and the first information is mapped from a first trigger event by the first electronic device and can be recognized by the second electronic device if it is detected that the first trigger event is generated when the first electronic device outputs based on the display data a first display content via the first display unit, where the first display content is same as the second display content.

In this embodiment of the present disclosure, when the second electronic device outputs based on the display data the second display content via the second display unit, the display data can be transmitted to the first electronic device, so that the first electronic device can simultaneously display the first display content based on the display content via the first display unit of the first electronic device. The second display content is same as the first display content. Thus the first electronic device is enabled to synchronously display the content of the second electronic device of the second electronic device.

The second display content may be a content being displayed in the second electronic device, or a content to be displayed.

Step S42 includes performing a first operation according to the first information upon receiving the first information transmitted by the first electronic device.

In this embodiment of the present disclosure, the second electronic device performs the first operation based on the first information transmitted by the first electronic device, so that an input operation from the first electronic device can be recognized by the second electronic device. Thus, the user can control the second electronic device via the first electronic device with a control instruction that the second electronic device cannot recognize, which improves convenience for the user to perform an operation onto the second electronic device.

Optionally, the monitoring whether first information transmitted by a first electronic device is received includes:

monitoring whether data information, such as characters like Chinese characters, symbols, numbers, or Chinese Pinyin, that can be recognized by the second electronic device, is received. In other words, if a user wants to input data information into the second electronic device, the data information to be input can be determined by an input method editor in the first electronic device and transmitted to the second electronic device, then the second electronic device displays the data information at a predetermined location of the display area.

The coordinate mapping relationship between a display area of the first electronic device and of the display area of the second electronic device may be established, so that the coordinates for displaying the data information on the second electronic device can be determined according to determined coordinates of a spot where the inputting is performed on the first electronic device.

Or, the first trigger event may be mapped to a first control instruction corresponding to a second trigger event that can be recognized by the second electronic device, i.e., the first trigger event is mapped to a control instruction that can be recognized by the second electronic device.

For instance, in a case that the first electronic device is a computer and the second electronic device is a cell phone, the event triggered by a combination of three keys "ctrl," "alt," and "del" in the computer may be mapped to a screen lock control instruction in the cell phone. The "PageUP" or the "PageDown" key pressing in the computer may be mapped to a slide operation to the left or to the right on the touch screen of the cell phone. An operation of rolling the wheel of the mouse upward or downward in the computer may be mapped to a slide operation upward or downward on the touch screen of the cell phone.

A particular control instruction to which a trigger event is mapped may be set according to an operating habit of the user.

In this embodiment of the present disclosure, a user not only can control the second electronic device from the first electronic device, but also can input information into the second electronic device by the aid of an input method editor and an input device of the first electronic device.

Usually, an input method editor of the first electronic device and an input method editor of the second electronic device are different. In order to avoid confliction between the input method editor of the first electronic device and the input method editor of the second electronic device when information is input into the second electronic device via the first electronic device, the input method editor of the second electronic device can be blocked, i.e., the second electronic device does not respond to the input method editor of the second electronic device when the second electronic device transmits display data (where the display data is transmitted by the second electronic device to the first electronic device and corresponds to a second display content of the second electronic device) to the first electronic device.

Optionally, the monitoring whether first information transmitted by a first electronic device is received includes:

determining whether the first trigger event can be recognized by the second electronic device upon receiving the first trigger event transmitted by the first electronic device;

determining the first information transmitted by the first electronic device is received if it is determined that the first trigger event can be recognized by the second electronic device, where the first information is the first trigger event; and transmitting a parsing request to the first electronic device if the first trigger event cannot be recognized by the second electronic device, and receiving the first information transmitted by the first electronic device, where the first information is mapped from the first trigger event by the first electronic device.

In this embodiment of the present disclosure, the first electronic device directly transmits the first trigger event to the second electronic device, and then whether the second electronic device can recognize the first trigger event is determined by the second electronic device. It is determined that the first information transmitted by the first electronic device is received if the second electronic device can recognize the first information, i.e., the first trigger event. The parsing request is transmitted to the first electronic device if the second electronic device cannot recognize the first trigger event. The first trigger event is mapped only if the first electronic device receives the parsing request transmitted by the second electronic device, so that the first electronic device can map the first trigger event into first information that can be recognized by the second electronic device. It improves operating efficiency and lowers power consumption of the first electronic device.

Figure 5:
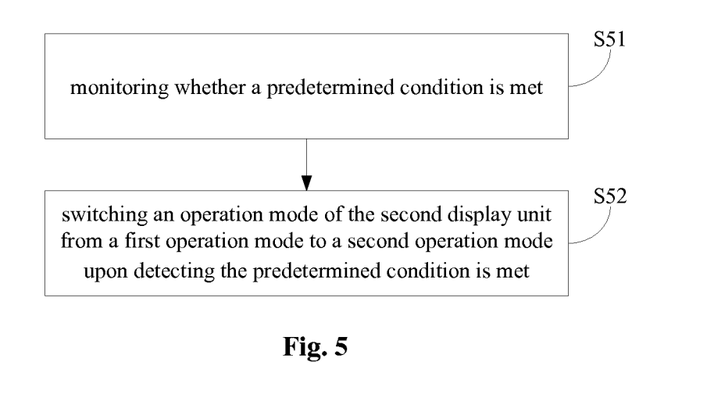
FIG. 5 is a flowchart of yet another implementation of a control method according to an embodiment of the present disclosure.

Furthermore, in order to reduce power consumption of the second electronic device, a flowchart of another implementation of the control method according to the present disclosure is illustrated in FIG. 5, which may further include:

step S51 including monitoring whether a predetermined condition is met; and step S52 including switching an operation mode of the second display unit from a first operation mode to a second operation mode upon detecting the predetermined condition is met, where the power consumption of the second display unit in the first operation mode is higher than that in the second operation mode.

For instance, brightness of the second display unit in the first operation mode device may be higher than that in the second operation mode. The brightness of the second display unit in the second operation mode may be zero, or the second display unit is turned off.

In this embodiment of the present disclosure, if the second electronic device is in the first operation mode, the operation mode of the second display unit is switched from the first operation mode to the second operation mode to reduce the power consumed by the second display of the second electronic device if it is detected that the predetermined condition is met.

Optionally, the monitoring whether a predetermined condition is met may include:

monitoring whether the second electronic device transmits the display data to the first electronic device; and determining the predetermined condition is met if it is detected that the second electronic device transmits the display data to the first electronic device.

In this embodiment of the present disclosure, the operation mode of the second display unit is switched from the first operation mode to the second operation mode when the second electronic device transmits the display data to the first electronic device.

Optionally, the determining the predetermined condition is met if it is detected that the second electronic device transmits the display data to the first electronic device may include:

determining a current display brightness of the second display unit upon detecting the second electronic device transmits the display data to the first electronic device;

determining a duration when the second display unit continuously displays with the display brightness, in a case that the current display brightness of the second display unit is within a predetermined range; and determining the predetermined condition is met if the second display unit has continuously displayed with the display brightness for a predetermined duration.

Optionally, the determining the predetermined condition is met if it is detected that the second electronic device transmits the display data to the first electronic device may include:

monitoring whether one or more predetermined target keys are pressed down in a predetermined manner upon detecting the second electronic device transmits the display data to the first electronic device;

generating a second control instruction based on the target keys upon detecting the target keys are pressed down in the predetermined manner; and determining the predetermined condition is met upon detecting the second control instruction is generated based on the target keys.

The method above may further include:

detecting whether the predetermined target keys are pressed down in the predetermined manner when the second electronic device transmits the display data to the first electronic device; and generating a third control instruction based on the target keys upon detecting the target keys are pressed down in the predetermined manner, where the function of the third control instruction is different from that of the second control instruction.

Optionally, the second display unit may be a touch screen, and when the second electronic device transmits the display data to the first electronic device, the method may further include:

detecting whether a touch event based on the second display unit is generated if the current display brightness of the second display unit is lower than a predetermined brightness; and not responding, with an application corresponding to the second display content, to the touch event based on the second display unit upon detecting the touch event based on the second display unit is generated.

In this embodiment of the present disclosure, if the second electronic device is transmitting the display data to the first electronic device and the current display brightness of the second display unit is lower than the predetermined brightness, then the touch operation on the second display unit performed by the user is not responded, in order to avoid misoperations performed by the user.

Optionally, the second display unit may be a touch screen and when the second electronic device transmits the display data to the first electronic device, the method may further include:

detecting whether a touch event based on the second display unit is generated if the current display brightness of the second display unit is lower than a predetermined brightness; and switching the operation mode of the second display unit from the first operation mode to the second operation mode upon detecting a touch event based on the second display unit is generated, where the display brightness of the second display unit in the first operation mode is lower than that in the second operation mode.

In this embodiment of the present disclosure, if the second electronic device is transmitting the display data to the first electronic device and the current display brightness of the second display unit is lower than the predetermined brightness, then the brightness of the second display unit is increased upon receiving the touch operation by the user.

Optionally, the second display unit may be a touch screen and when the second electronic device transmits the display data to the first electronic device, the method may further include:

detecting whether a touch event based on the second display unit is generated if the current display brightness of the second display unit is lower than a predetermined brightness; and upon detecting the touch event based on the second display unit is generated, not responding to the touch event based on the second display unit by an application corresponding to the second display content, but switching the operation mode of the second display unit from the first operation mode to the second operation mode;

where the display brightness of the second display unit in the first operation mode is lower than that in the second operation mode.

In this embodiment of the present disclosure, if the second electronic device is transmitting the display data to the first electronic device and the current display brightness of the second display unit is lower than the predetermined brightness, then the touch operation by the user is not responded but merely the brightness of the second display unit is increased.

Figure 6:
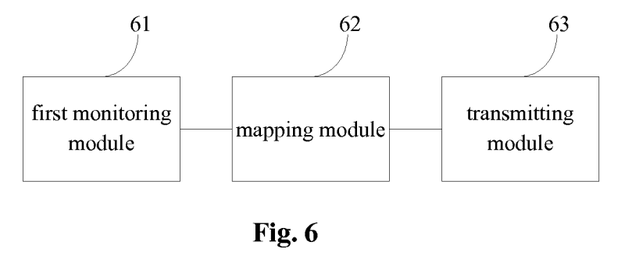
FIG. 6 is a structural schematic diagram of a control apparatus according to an embodiment of the present disclosure.

Accordingly, a control apparatus is provided according to the method embodiments of the present disclosure. A structural schematic diagram of the control apparatus is illustrated in FIG. 6. The apparatus may include:

a first monitoring module 61, a mapping module 62 and a transmitting module 63.

The first monitoring module 61 is configured to monitor whether a first trigger event is generated when the first electronic device outputs, based on display data, a first display content via a first display unit coupled to the first electronic device, where the display data is transmitted to the first electronic device by a second electronic device and corresponds to a second display content of the second electronic device, where the second display content is same as the first display content.

The mapping module 62 is configured to map the first trigger event to first information that can be recognized by the second electronic device, if it is detected that the first trigger event is generated.

And the transmitting module 63 is configured to transmit the first information to the second electronic device, where the first information is used to instruct the second electronic device to perform a first operation.

According to the control apparatus provided in this embodiment of the present disclosure, the first monitoring module 61 monitors whether a first trigger event is generated when the first electronic device outputs, based on display data, a first display content via the first display unit, where the display data is transmitted to the first electronic device by a second electronic device and corresponds to a second display content of the second electronic device, where the second display content is same as the first display content. If it is detected that the first trigger event is generated, the mapping module maps the first trigger event to first information that can be recognized by the second electronic device. And the transmitting module transmits the first information to the second electronic device, to instruct the second electronic device to perform a first operation. Thus, the source electronic device can recognize and process the input operation that is performed from the target electronic device and is originally not supported by the source electronic device, thereby improving convenience in the user's operation on the second electronic device.

Figure 7:
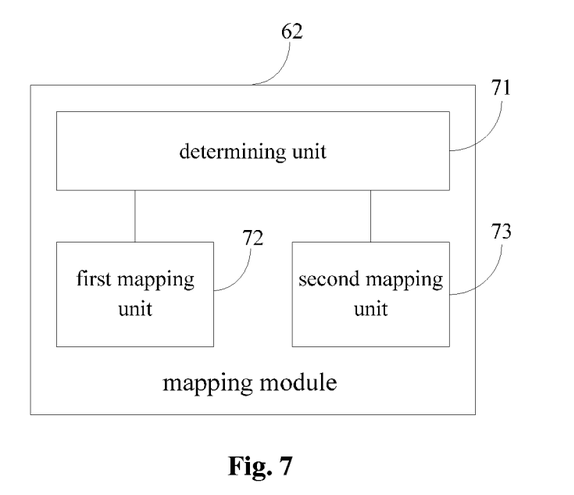
FIG. 7 is a structural schematic diagram of a mapping module according to an embodiment of the present disclosure.

Optionally, a structural schematic diagram of the mapping module 62 is illustrated in FIG. 7, which may include:

a determining unit 71, a first mapping unit 72 and a second mapping unit 73.

The determining unit 71 is configured to determine whether the first trigger event is a trigger event that can be recognized by the second electronic device.

The first mapping unit 72 is configured to map the first trigger event to the first information that can be recognized by the second electronic device, if the determining unit 71 determines the first trigger event is not a trigger event that can be recognized by the second electronic device.

And the second mapping unit 73 is configured to determine the first trigger event to be the first information, if the determining unit 71 determines the first trigger event is a trigger event that can be recognized by the second electronic device.

Figure 8:
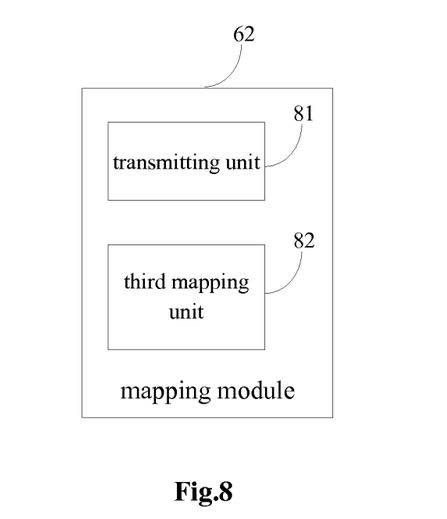
FIG. 8 is another structural schematic diagram of a mapping module according to an embodiment of the present disclosure.

Optionally, another structural schematic diagram of the mapping module 62 is illustrated in FIG. 8, which may include:

a transmitting unit 81 and a third mapping unit 82.

The transmitting unit 81 is configured to transmit the first trigger event to the second electronic device.

And the third mapping unit 82 is configured to map the first trigger event to the first information that can be recognize by the second electronic device, upon receiving a parsing request transmitted by the second electronic device.

Optionally, the mapping module 62 may map the first trigger event to data information that can be recognized by the second electronic device, or to a first control instruction corresponding to a second trigger event that can be recognized by the second electronic device.

Figure 9:
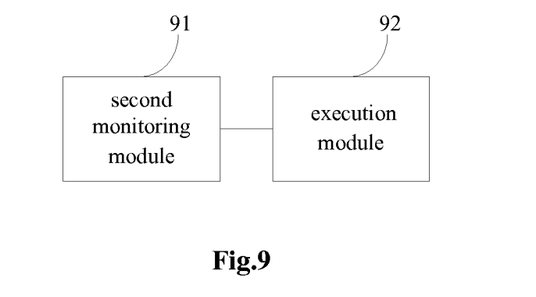
FIG. 9 is another structural schematic diagram of a control apparatus according to an embodiment of the present disclosure.

Another structural schematic diagram of the control apparatus is illustrated in FIG. 9. The control apparatus may include:

a second monitoring module 91 and an execution module 92.

The second monitoring module 91 is configured to monitor whether first information transmitted by a first electronic device is received by a second electronic device when the second electronic device transmits display data to the first electronic device, where the display data corresponds to a second display content output by the second electronic device via a second display unit coupled to the second electronic device, and the first information is mapped from a first trigger event by the first electronic device and can be recognized by the second electronic device if it is detected that the first trigger event is generated when the first electronic device outputs based on the display data a first display content via the first display unit, where the first display content is same as the second display content.

The execution module 92 is configured to perform a first operation a first operation according to the first information in a case that the second monitoring module detects that the first information transmitted by the first electronic device is received.

Optionally, when the second electronic device transmits display data to the first electronic device, the second monitoring module 91 is configured to monitor whether data information that can be recognized by the second electronic device or a first control instruction corresponding to a second trigger event that is transmitted by the first electronic device is received by the second electronic device. In other words, the first information may be data information that can be recognized by the second electronic device, or a first control instruction corresponding to a second trigger event that can be recognized by the second electronic device.

Figure 10:
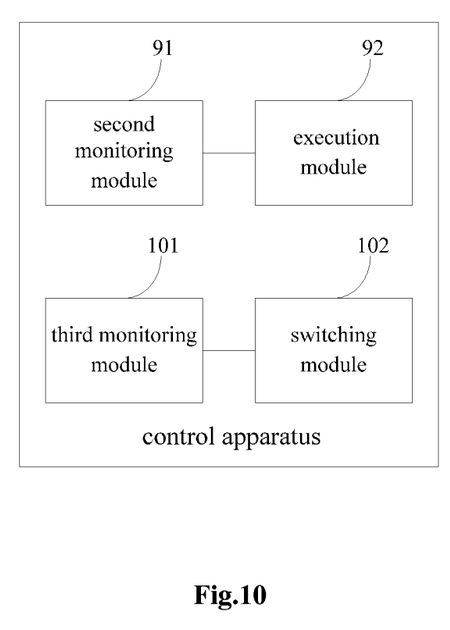
FIG. 10 is yet another structural schematic diagram of a control apparatus according to an embodiment of the present disclosure.

Based on the embodiment as illustrated in FIG. 9, another structural schematic diagram of the control apparatus according to an embodiment of the present disclosure is illustrated in FIG. 10, where the control apparatus may further include:

a third monitoring module 101 and a switching module 102.

The third monitoring module is configured to monitor whether a predetermined condition is met.

And the switching module 102 is configured to switch the operation mode of the second display unit from a first operation mode to a second operation mode in a case that the third monitoring module detects that the predetermined condition is met;

where the power consumption of the second display unit in the first operation mode is higher than that in the second operation mode.

Optionally, the third monitoring module 101 is configured to monitor whether the second electronic device transmits the display data to the first electronic device. The predetermined condition is met if it is detected that the second electronic device transmits the display data to the first electronic device.

Optionally, in a case that the second electronic device transmits the display data to the first electronic device, the second monitoring module 91 is configured to: determine whether the first trigger event can be recognized by the second electronic device upon receiving the first trigger event transmitted by the first electronic device; determine the first information transmitted by the first electronic device is received if it is determined that the first trigger event can be recognized by the second electronic device, where the first information is the first trigger event; transmit a parsing request to the first electronic device if the first trigger event cannot be recognized by the second electronic device, and receive the first information transmitted by the first electronic device, where the first information is mapped from the first trigger event by the first electronic device.

An electronic device is further provided according to embodiments of the present disclosure, where the electronic device includes the control apparatuses according to any of the apparatus embodiments.

Those of skill in the art would appreciate that the various illustrative units and steps provided according to the embodiments disclosed herein may be implemented as electronic hardware or a combination of computer software and electronic hardware. Whether such functions are implemented as hardware or software depends upon particular application and design constraints imposed on the technical scheme. Those skilled may implement the described functions in various ways for each particular application, but such implementation decisions should not be construed as departing from the scope of the present disclosure.

Those skilled in the art will clearly appreciate that the corresponding processes in embodiments of the foregoing method can be referred to for operational details of the systems if any, apparatuses and units described above, which are not repeated here for conciseness of the description.

It should be understood that the systems if any, apparatuses and method provided in the embodiments of the present disclosure may be implemented in other ways. For example, the apparatus embodiments described above are merely illustrative. For example, the unit division is merely logical function division and may be other division in practical implementations. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the apparatuses or units may be implemented in electronical, mechanical or other forms.

The units described as separate parts may be or be not physically separate, and parts displayed as units may be or be not physical units, which may be located in one position or distributed on a plurality of network units. A few or all of the units may be selected as desired to achieve the objectives of the solutions of the embodiments.

In addition, functional units in the embodiments of the present application may be integrated into one processing unit, or each of the units may exist alone physically, or two or more units are integrated into one unit.

When being implemented in the form of software functional unit sold or used as a separate product, the unit may be stored in a computer readable storage medium. Based on such understanding, the technical solutions of the present disclosure essentially, or the part contributing to the prior art, or all or a part of the technical solutions may be implemented in the form of a software product. The computer software product is stored in a storage medium and includes several instructions for instructing a computer device (which may be a personal computer, a server, or a network device, or the like) to executive all or a few steps of the methods according to the embodiments of the present disclosure. The storage medium includes: any medium that can store program codes, such as a flash disk, a removable hard disk, a read-only memory (ROM, Read-Only Memory), a random access memory (RAM, Random Access Memory), a magnetic disk, or an optical disk.

Above descriptions of embodiments of the present disclosure enable those skilled in the art to implement or apply the disclosure. Numerous modifications made to embodiments of the present disclosure are obvious to those skilled in the art, and general principles defined in the paper can be implemented in other embodiments without deviation from technical essence or scope of the present disclosure. Thus, the present disclosure is not limited to embodiments in the paper, but falls within the widest scope consistent with principles and novelties provided in the disclosure in this paper.

The invention claimed is:

1. A control method, comprising:
monitoring, by a second electronic device, whether first information transmitted by a first electronic device is received by the second electronic device when the second electronic device transmits display data to the first electronic device, wherein the display data corresponds to a second display content output by the second electronic device via a second display unit coupled to the second electronic device, and the first information is mapped from a first trigger event by the first electronic device and can be recognized by the second electronic device if generation of the first trigger event is detected when the first electronic device outputs based on the display data a first display content via a first display unit, wherein the first display content is same as the second display content; and
performing, by the second electronic device, a first operation according to the first information upon receiving the first information transmitted by the first electronic device,
wherein the monitoring, by the second electronic device, whether first information transmitted by a first electronic device is received comprises:
determining, by the second electronic device, whether the first trigger event can be recognized by the second electronic device upon receiving the first trigger event transmitted by the first electronic device;
determining, by the second electronic device, the first information transmitted by the first electronic device is received upon determining that the first trigger event can be recognized by the second electronic device, wherein the first information is the first trigger event; and
transmitting, by the second electronic device, a parsing request to the first electronic device upon determining that the first trigger event cannot be recognized by the second electronic device, and receiving, by the second electronic device, the first information transmitted by the first electronic device, wherein the first information is mapped from the first trigger event by the first electronic device.

2. The method according to claim 1, wherein the first information transmitted by the first electronic device comprises at least one of:
data information that is transmitted by the first electronic device and can be recognized by the second electronic device and a first control instruction corresponding to a second trigger event that can be recognized by the second electronic device.

3. The method according to claim 1, further comprising:
monitoring whether a predetermined condition is met; and
switching an operation mode of the second display unit from a first operation mode to a second operation mode upon detecting the predetermined condition is met, wherein a power consumption of the second display unit in the first operation mode is higher than that in the second operation mode.

4. The method according to claim 3, wherein the monitoring whether a predetermined condition is met comprises:
monitoring whether the second electronic device transmits the display data to the first electronic device; and
determining the predetermined condition is met if it is detected that the second electronic device transmits the display data to the first electronic device.

5. A control apparatus used within a second electronic device, the control apparatus comprising a processor and a memory having processor-executable instructions stored therein, wherein the processor-executable instructions, when executed by the processor, configure the control apparatus to:
monitor whether first information transmitted by a first electronic device is received by the second electronic device when the second electronic device transmits display data to the first electronic device, wherein the display data corresponds to a second display content output by the second electronic device via a second display unit coupled to the second electronic device, and the first information is mapped from a first trigger event by the first electronic device and can be recognized by the second electronic device if generation of the first trigger event is detected when the first electronic device outputs based on the display data a first display content via a first display unit, wherein the first display content is same as the second display content; and
perform a first operation according to the first information upon receiving the first information transmitted by the first electronic device;
wherein monitoring whether the first information transmitted by the first electronic device is received comprises:
determining whether the first trigger event can be recognized by the second electronic device upon receiving the first trigger event transmitted by the first electronic device;
determining the first information transmitted by the first electronic device is received upon determining that the first trigger event can be recognized by the second electronic device, wherein the first information is the first trigger event;
transmitting a parsing request to the first electronic device upon determining that the first trigger event cannot be recognized by the second electronic device, and receiving the first information transmitted by the first electronic device, wherein the first information is mapped from the first trigger event by the first electronic device.

6. The apparatus according to claim 5, wherein the first information transmitted by the first electronic device comprises at least one of:
data information that is transmitted by the first electronic device and can be recognized by the second electronic device and a first control instruction corresponding to a second trigger event that can be recognized by the second electronic device.

7. The apparatus according to claim 5, wherein the processor-executable instructions further configure the control apparatus to:
monitor whether a predetermined condition is met; and
switch an operation mode of the second display unit from a first operation mode to a second operation mode upon detecting the predetermined condition is met, wherein a power consumption of the second display unit in the first operation mode is higher than that in the second operation mode.

8. The apparatus according to claim 7, wherein monitoring whether the predetermined condition is met comprises:
monitoring whether the second electronic device transmits the display data to the first electronic device; and
determining the predetermined condition is met if it is detected that the second electronic device transmits the display data to the first electronic device.

* * * * *